No. 638,159. Patented Nov. 28, 1899.
F. S. WORSLEY.
CARBON HOLDER FOR ELECTRIC ARC LAMPS.
(Application filed Nov. 22, 1897.)

(No Model.)

WITNESSES:

INVENTOR
FREDERIC S. WORSLEY
BY

ATTORNEYS.

UNITED STATES PATENT OFFICE.

FREDERIC S. WORSLEY, OF LONDON, ENGLAND, ASSIGNOR TO THE BRITISH BLAHNIK ARC LIGHT COMPANY, LIMITED, OF SAME PLACE.

CARBON-HOLDER FOR ELECTRIC-ARC LAMPS.

SPECIFICATION forming part of Letters Patent No. 638,159, dated November 28, 1899.

Application filed November 22, 1897. Serial No. 659,457. (No model.)

*To all whom it may concern:*

Be it known that I, FREDERIC STANHOPE WORSLEY, electrical engineer, a subject of the Queen of Great Britain and Ireland, residing at 119 Church Lane, Charlton, London, in the county of Kent, England, have invented certain Improvements in Carbon-Holders for Electric-Arc Lamps, of which the following is a specification.

This invention has for its object to provide means whereby a carbon-holder can be readily adapted for receiving and holding carbons of different diameters.

Figure 1:
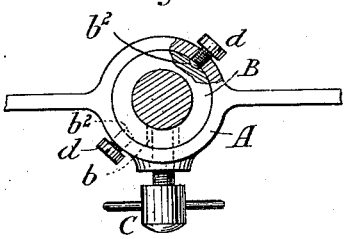
Figure 2:
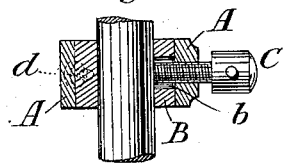
Figure 3:
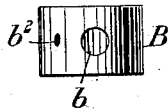

The accompanying drawings represent in plan, partly in section in Figure 1 and in vertical section in Fig. 2, a holder made in accordance with this invention. Fig. 3 shows an inner socket or bush separately.

According to this invention the carbon-holder is made with a "permanent" socket A of a size sufficient to accommodate a carbon of the largest diameter applicable for use in the particular lamp with which the holder is to be used, and for each such holder there is provided a socket or bush B whose external diameter is substantially the same as the bore of the permanent socket A into which it is fitted and whose bore is of a diameter substantially the same as that of the smaller size of carbon to be used in the lamp. If the holder is to accommodate more than two sizes of carbons, a similar socket or bush may be fitted into this socket or bush for the next smaller size carbon and so on with any number of such sockets or bushes in accordance with the number of sizes of carbons to be used in the lamp, or for each size carbon a socket or bush B may be provided with a bore to fit the carbon and an external diameter to fit the permanent socket. The sockets or bushes may be cylindrical or of any other suitable shape in cross-section.

The sockets or bushes may be secured in place and the carbons be fixed therein by any suitable means—for example, for securing the carbon they may be provided with a hole $b$, through which a pinching-screw C passes, which screw C when screwed inward in the screw-hole therefor in the permanent socket A passes through the said hole $b$ and bears on the carbon to hold it in position, and the socket or bush or sockets or bushes may be held in place by a screw or screws $d$, passing through a screwed hole or screwed holes in the permanent socket A and through the other socket or each of the other sockets, if more than two be used, and engaging in a recess or recesses $b^2$ in the socket or bush to be held.

Having now particularly described and ascertained the nature of this invention and in what manner the same is to be performed, I declare that what I claim is—

A carbon-holder for electric-arc lamps consisting of a permanent socket A, and a removable bush B provided with a hole $b$ for the passage of the screw C, threaded into the permanent socket and which pinches the carbon, and with means for fixing, consisting of a securing-screw $d$ and recess $b^2$, substantially as hereinbefore described.

In testimony whereof I have signed my name to this specification in the presence of two subscribing witnesses.

FREDERIC S. WORSLEY.

Witnesses:
 CHAS. MILLS,
 WILLIAM F. UPTON.